(12) United States Patent
Hamada

(10) Patent No.: US 7,035,225 B2
(45) Date of Patent: Apr. 25, 2006

(54) METHOD OF AND APPARATUS FOR CALCULATING TRANSIT TRAFFIC IN INDIVIDUAL ROUTERS

(75) Inventor: Tsuneo Hamada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 971 days.

(21) Appl. No.: 10/066,677

(22) Filed: Feb. 6, 2002

(65) Prior Publication Data

US 2002/0118678 A1 Aug. 29, 2002

(30) Foreign Application Priority Data

Feb. 28, 2001 (JP) ............................. 2001-053893

(51) Int. Cl.
*H04L 12/26* (2006.01)
(52) U.S. Cl. ...................................... 370/252; 370/401
(58) Field of Classification Search ................ 370/252, 370/253, 401
See application file for complete search history.

(56) References Cited

U.S. PATENT DOCUMENTS

| 6,768,718 | B1 * | 7/2004 | Beshai et al. ................ 370/237 |
| 2002/0105915 | A1 * | 8/2002 | Hamada ...................... 370/252 |
| 2002/0174246 | A1 * | 11/2002 | Tanay et al. ................. 709/238 |

* cited by examiner

*Primary Examiner*—Melvin Marcelo
(74) *Attorney, Agent, or Firm*—Venable LLP; Michael A. Sartori; Stuart Smith

(57) ABSTRACT

In a method of calculating transit traffic in a router including interfaces, a transit traffic matrix matching with the total number of subject interfaces whose transit traffic should be calculated is generated and initialized. The IF traffic matrix of each of the subject interfaces is obtained. Subsequently, a routing table searched in order to obtain the value of an IF column of an entry matching with the IF traffic matrix. It is determined whether or not the value of the IF column obtained is representative of any one of the subject interfaces. Thereafter, the values PKT and OCT of the IF traffic matrix subjected to calculation are added to the transit traffic matrix. An apparatus for practicing the method is also disclosed.

10 Claims, 14 Drawing Sheets

| DST Net | Next Router | Metric | IF |
|---|---|---|---|
| 10.1.1.0/24 | – | 1 | if5 |
| 10.1.2.0/24 | 10.1.9.253 | 1 | if3 |
| 10.1.3.0/24 | 10.1.9.253 | 2 | if0 |
| 10.1.4.0/24 | 10.1.9.253 | 2 | if0 |
| 10.2.0.0/16 | 10.1.12.253 | 3 | if1 |
| 10.3.0.0/16 | 10.1.12.253 | 3 | if1 |
| ⋮ | | | |
| default | – | 2 | if2 |

Fig. 4

IFt-

| DST Node | SRC Node | PKT | OCT |
|---|---|---|---|
| 10.1.1.123 | 10.2.3.201 | 34436 | 5675675 |
| 10.1.1.123 | 10.2.3.200 | 454 | 6576756 |
| 10.2.100.7 | 10.2.4.110 | 36443 | 76575675 |
| 10.2.100.8 | 10.2.5.10 | 45 | 3455 |
| 10.3.65.18 | 10.3.123.9 | 8676 | 3457788 |
| 10.3.65.19 | 10.3.124.8 | 68688 | 12312346 |
| 10.3.66.18 | 10.4.124.9 | 6766 | 4645656 |
| ⋮ | | | |

| SRC IF | DST IF | | | | | | | | | |
|---|---|---|---|---|---|---|---|---|---|---|
| | if0 | | if1 | | if4 | | if5 | | total | |
| | pkt | oct | pkt | oct | pkt | oct | pkt | oct | pkt | oct |
| if0 | pkt | oct | pkt | oct | pkt | oct | pkt | oct | pkt | oct |
| if1 | pkt | oct | pkt | oct | pkt | oct | pkt | oct | pkt | oct |
| if4 | pkt | oct | pkt | oct | pkt | oct | pkt | oct | pkt | oct |
| if5 | pkt | oct | pkt | oct | pkt | oct | pkt | oct | pkt | oct |
| total | pkt | oct | pkt | oct | pkt | oct | pkt | oct | pkt | oct |

Fig. 12

|  | DST IF | | | | | | | |
|---|---|---|---|---|---|---|---|---|
|  | if0 | if1 | if2 | if3 | if4 | if5 | if6 | if7 |
| if0 | pkt00 oct00 | pkt01 oct01 | pkt02 oct02 | pkt03 oct03 | pkt04 oct04 | pkt05 oct05 | pkt06 oct06 | pkt07 oct07 |
| if1 | pkt10 oct10 | pkt11 oct11 | pkt12 oct12 | pkt13 oct13 | pkt14 oct14 | pkt15 oct15 | pkt16 oct16 | pkt17 oct17 |
| if2 | pkt20 oct20 | pkt21 oct21 | pkt22 oct22 | pkt23 oct23 | pkt24 oct24 | pkt25 oct25 | pkt26 oct26 | pkt27 oct27 |
| if3 | pkt30 oct30 | pkt31 oct31 | pkt32 oct32 | pkt33 oct33 | pkt34 oct34 | pkt35 oct35 | pkt36 oct36 | pkt37 oct37 |
| if4 | pkt40 oct40 | pkt41 oct41 | pkt42 oct42 | pkt43 oct43 | pkt44 oct44 | pkt45 oct45 | pkt46 oct46 | pkt47 oct47 |
| if5 | pkt50 oct50 | pkt51 oct51 | pkt52 oct52 | pkt53 oct53 | pkt54 oct54 | pkt55 oct55 | pkt56 oct56 | pkt57 oct57 |
| if6 | pkt60 oct60 | pkt61 oct61 | pkt62 oct62 | pkt63 oct63 | pkt64 oct64 | pkt65 oct65 | pkt66 oct66 | pkt67 oct67 |
| if7 | pkt70 oct70 | pkt71 oct71 | pkt72 oct72 | pkt73 oct73 | pkt74 oct74 | pkt75 oct75 | pkt76 oct76 | pkt77 oct77 |

SRC IF

| | DST IF | | | | | | | | | |
|---|---|---|---|---|---|---|---|---|---|---|
| | | if0 | | if1 | | if4 | | if5 | | total |
| SRC IF | if0 | pkt00 | oct00 | pkt01 | oct01 | pkt04 | oct04 | pkt05 | oct05 | pkt oct |
| | if1 | pkt10 | oct10 | pkt11 | oct11 | pkt14 | oct14 | pkt15 | oct15 | pkt oct |
| | if4 | pkt40 | oct40 | pkt41 | oct40 | pkt44 | oct44 | pkt45 | oct45 | pkt oct |
| | if5 | pkt50 | oct50 | pkt50 | oct51 | pkt54 | oct54 | pkt55 | oct55 | pkt oct |
| | total | pkt | oct | pkt | oct | pkt | oct | pkt | oct | pkt oct |

Fig. 15

| DST Net | Next Router | Metric | IF |
|---|---|---|---|
| 10.1.1.0/24 | — | 1 | if5 |
| 10.1.2.0/24 | 10.1.9.253 | 1 | if3 |
| 10.1.3.0/24 | 10.1.9.253 | 2 | if0 |
| 10.1.4.0/24 | 10.1.9.253 | 2 | if0 |
| 10.2.0.0/16 | 10.1.12.253 | 3 | if1 |
| 10.3.0.0/16 | 10.1.12.253 | 3 | if1 |
| ---- | | | |
| default | — | 2 | if2 |

| if0-Use | |
|---|---|
| PKT | OCT |
| 3453 | 89898 |
| 1234 | 78999 |
| 454 | 87678 |
| 876 | 8789 |
| 134 | 45466 |
| 7345 | 12455 |
| ---- | ---- |
| 234 | 73564 |
| 6547 | 93456 |

⋮

| if7-Use | |
|---|---|
| PKT | OCT |
| 3453 | 56565 |
| 435 | 76588 |
| 655 | 65765 |
| 765 | 8789 |
| 5456 | 54677 |
| 73455 | 75474 |
| ---- | ---- |
| 8765 | 746777 |
| 7757 | 75474 |

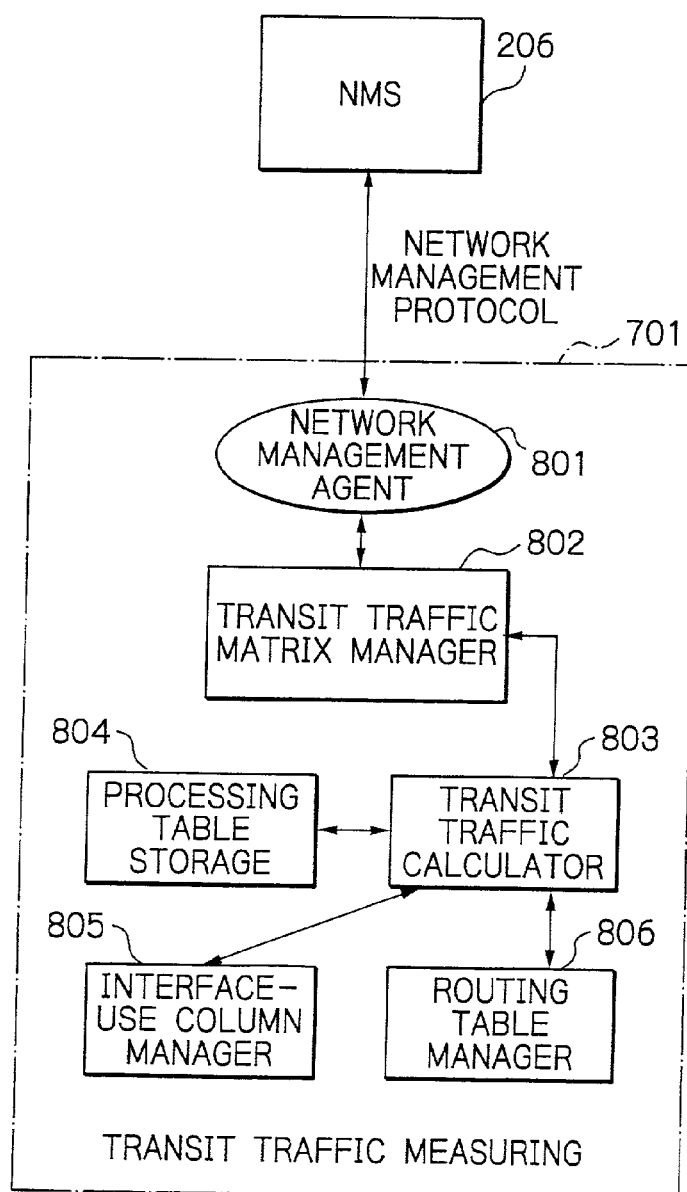

Fig. 18

| IF | if0-Use | | if1-Use | | if4-Use | | if5-Use | |
|---|---|---|---|---|---|---|---|---|
| | PKT | OCT | PKT | OCT | PKT | OCT | PKT | OCT |
| if5 | | | | | | | | |
| if3 | | | | | | | | |
| if0 | | | | | | | | |
| if0 | | | | | | | | |
| if1 | | | | | | | | |
| if1 | | | | | | | | |
| | ⋮ | ⋮ | ⋮ | ⋮ | ⋮ | ⋮ | ⋮ | ⋮ |
| if2 | | | | | | | | |

METHOD OF AND APPARATUS FOR CALCULATING TRANSIT TRAFFIC IN INDIVIDUAL ROUTERS

BACKGROUND OF THE INVENTION

1. Field of the Invention

The present invention relates to a network management system and more particularly to a method of and an apparatus for calculating transit traffic in individual routers.

2. Description of the Background Art

One of conventional schemes for collecting traffic statistics on a telecommunications network uses an RMON2 (Remote network MONitoring 2) feature particular to an SNMP (Simple Network Management Protocol). The RMON2 feature includes an MIB (Management Information Base) referred to as nlMatrix. The nlMatrix MIB indicates statistics on the transfer of L3 (Layer 3) packets switched via any desired network segment. More specifically, the nlMatix MIB collects information on the headers of L3 packets and stores statistics between end-to-end terminals in the form of a matrix of destination L3 addresses and source L3 addresses. The statistics include the total number of packets transferred and the total number of octets transferred.

The RMON2 feature is installed in a router, which transfers L3 packets, in the form of software or LSI (Large-Scale Integration) circuit for filtering packets, or in the form of monitoring device exclusively directed to packet filtering.

An NMS (Network Management System) that manages a telecommunications network uses the SNMP to collect the statistics from routers or monitoring devices having the RMON2 feature.

The nlMatrix MIB particular to the RMON2 feature is representative of statistics on the traffic of a desired network segment. The nlMatix MIB is therefore preferably applicable to grasping the concentration of traffic on a certain server or the congestion of traffic in a network segment. However, such statistics do not allow traffic in an individual or specific router to be grasped alone.

SUMMARY OF THE INVENTION

It is an object of the present invention to provide a transit traffic calculating method that allows traffic in individual routers to be grasped, and an apparatus for practicing the same.

A method of calculating transit traffic in a router including a plurality of interfaces includes the step of generating a transit traffic matrix matching with the total number of subject interfaces whose transit traffic should be calculated and initializing the transit traffic matrix. The IF traffic matrix of each of the subject interfaces is obtained. Subsequently, a routing table is searched in order to obtain the value of an IF column of an entry matching with the IF traffic matrix. It is determined whether or not the value of the IF column obtained is representative of any one of the subject interfaces. Thereafter, the values PKT and OCT of the IF traffic matrix subjected to calculation are added to the transit traffic matrix.

Further in accordance with the present invention, an apparatus for calculating transit traffic in a router including a plurality of interfaces comprises: a circuit for generating a transit traffic matrix matching with a total number of subject interfaces whose transit traffic should be calculated and initializing the transit traffic matrix; a circuit for obtaining an interface traffic matrix of each of the subject interfaces and searching a routing table to thereby obtain a value of an interface column of an entry matching with the interface traffic matrix; a circuit for determining whether or not the value of the interface column obtained is representative of any one of the subject interfaces; and a circuit for adding values PKT and OCT of the interface traffic matrix currently subjected to calculation to the transit traffic matrix.

BRIEF DESCRIPTION OF THE DRAWINGS

The objects and features of the present invention will become more apparent from consideration of the following detailed description taken in conjunction with the accompanying drawings in which:

FIG. 3 shows a specific format of a routing table;

FIG. 4 shows a specific format of an IF (interface) traffic matrix;

FIG. 12 shows a transit traffic matrix covering all interfaces and prepared by the transit traffic measuring section of FIG. 11;

FIG. 15 schematically shows a routing table and interface-Use columns particular to the embodiment of FIG. 14;

FIG. 16 is a schematic block diagram, similar to FIG. 5, showing a transit traffic measuring section included in the embodiment of FIG. 14;

FIG. 18 shows a preprocessing table prepared in the procedure of FIGS. 17A and 17B.

DESCRIPTION OF THE PREFERRED EMBODIMENTS

Figure 1:
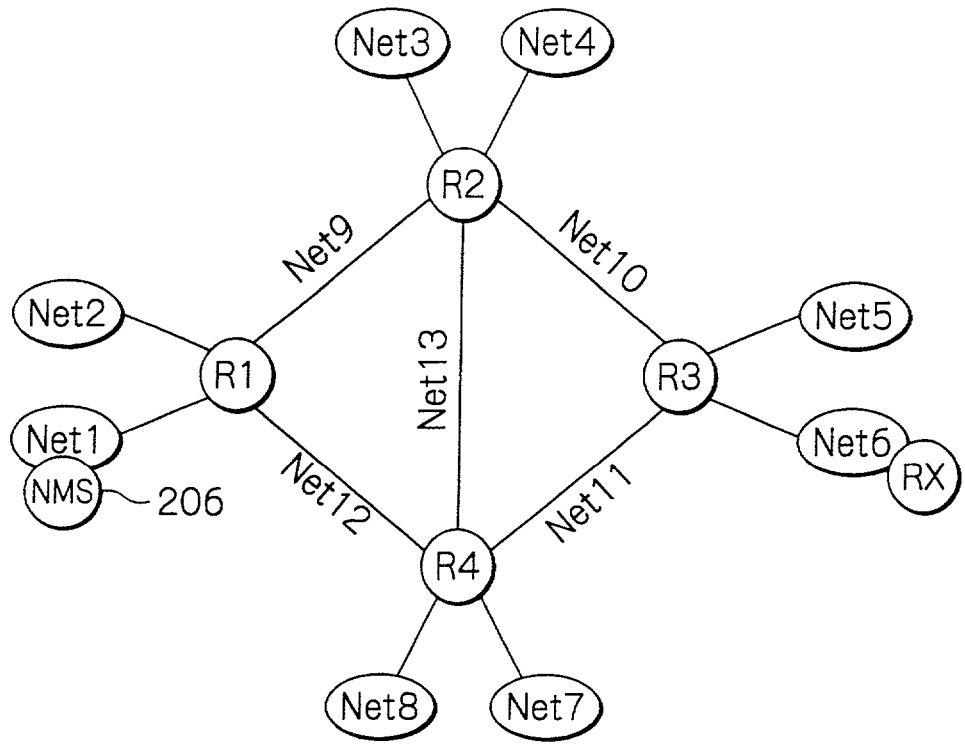
FIG. 1 is a schematic block diagram showing a specific network to which a preferred embodiment of the method and apparatus is applied in accordance with the present invention.

Referring to FIG. 1 of the drawings, the present invention is applicable to a specific telecommunications network which includes routers R1 through R4 and a default router RX that is adapted to transfer packets to the outside of the network. The network also includes network segments Net1 through Net8, each of which includes a terminal and a server. The router R1 is connected to the routers R2 and R4 by point-to-point network segments Net9 and Net12, respectively. The router R3 is connected to the routers R2 and R4 also by point-to-point network segments Net10 and Net11, respectively. The routers R2 and R4 are interconnected by a point-to-point network segment Net13. An NMS 206 is shown as being located at the network segment Net1 in order to manage the traffic of the entire network.

Figure 2:
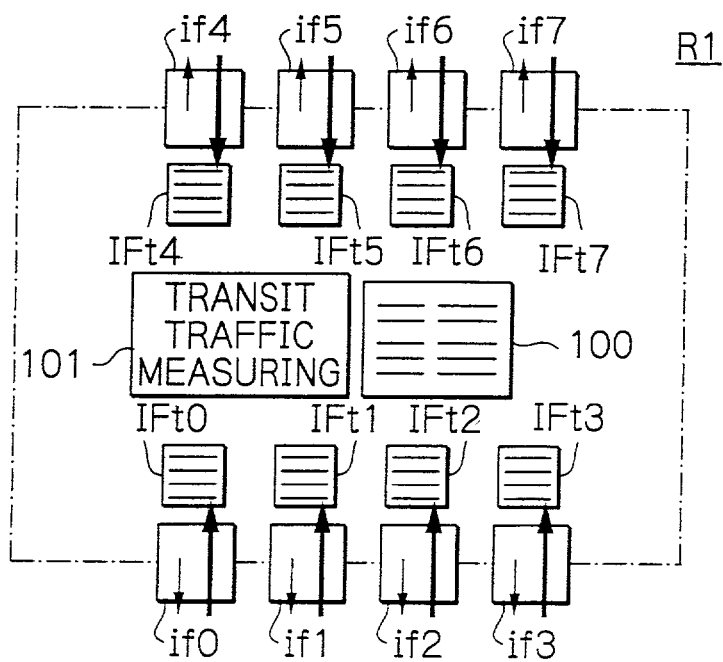
FIG. 2 is a schematic block diagram showing a specific configuration of a router included in the embodiment shown in FIG. 1.

FIG. 2 shows a specific configuration of the router R1. The other routers R2 through R4 and default router RX are identical in configuration with the router R1 to be described and will not be described specifically in order to avoid redundancy. As shown, the router R1 includes a plurality of (eight in the illustrative embodiment) interfaces if0 through if7. The interfaces if0 through if7 include IF traffic matrices IFt0 through IFt7, respectively. The router R1 also includes a routing table 100 which is adapted to record destinations together with other information. The router R1 also includes a transit traffic measuring section 101 which is adapted to measure traffic to be transferred by the router R1. The interfaces if0 through if7 are interconnected to other routers and other network segments.

When the router R1 receives an L3 (layer 3) packet, it transfers the L3 packet with the routing table 100 referenced. More specifically, the router R1 searches the routing table 100 to find out an entry matching with the received L3 packet and then transfers the L3 packet to one of the interfaces if0 through if7 which is indicated by the entry.

FIG. 3 shows a specific format of the routing table 100. As shown, the routing table 100 includes columns DST Net, Next Router, Metric, and IF. DST Net is representative of a destination network while Next Router is of the address of a router to which a packet should be sent next. Metric and IF are respectively representative of a cost necessary for a packet to reach a destination network and an interface to which Next Router is connected.

The IF traffic matrices IFt0 though IFt7, FIG. 1, included in the interfaces if0 through if7, respectively, store the statistics of L3 packets received via the associated interface. FIG. 4 shows a specific format of the IF traffic matrix. As shown, the IF traffic matrix includes columns DST Node, SRC Node, PKT, and OCT. DST and SRC Nodes are representative of a destination address and a source address, respectively. PKT is representative of the cumulative number of packets received by the specific combination of a destination node and a source node. OCT is representative of the cumulative number of octets received by the specific combination of a destination node and a source node.

Figure 5:
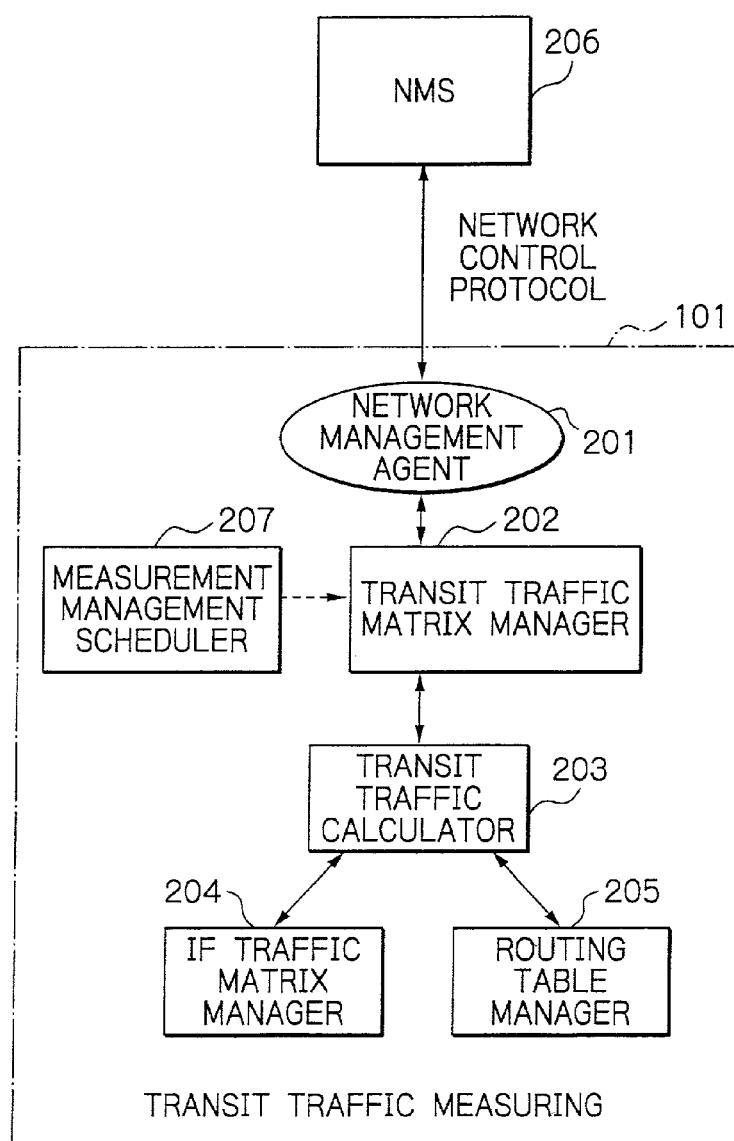
FIG. 5 is a block diagram showing a specific configuration of a transit traffic measuring section also included in the router of FIG. 2.

FIG. 5 shows a specific configuration of the transit traffic measuring section 101. As shown, the transit traffic measuring section 101 includes a network management agent 201, a transit traffic matrix manager 202, a transit traffic calculator 203, an IF traffic matrix manager 204, a routing table manager 205, and a measurement management scheduler 207, which are associated with each other as shown by the solid and phantom arrows.

Figure 6A:
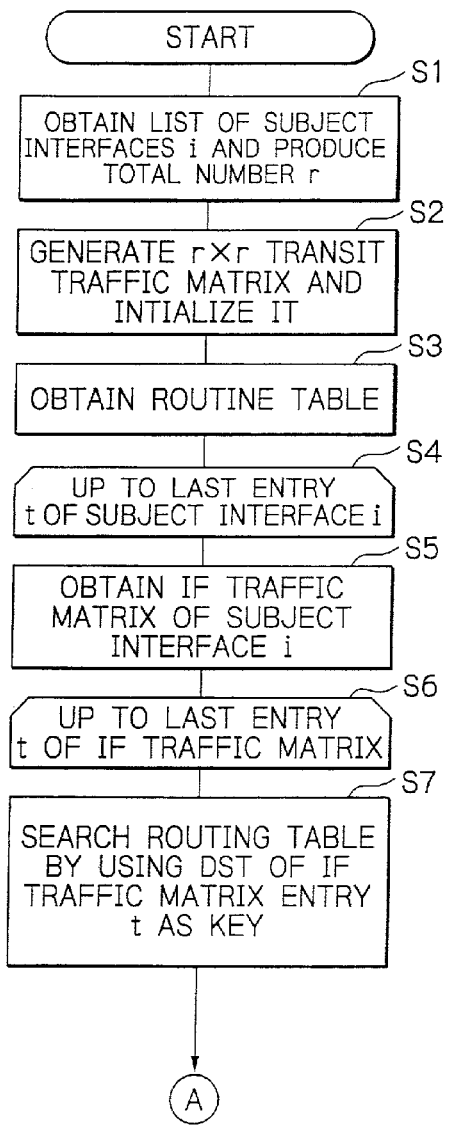
FIGS. 6A and 6B are flowcharts useful for understanding a specific, transit traffic measurement procedure executed in the illustrative embodiment.
Figure 6B:
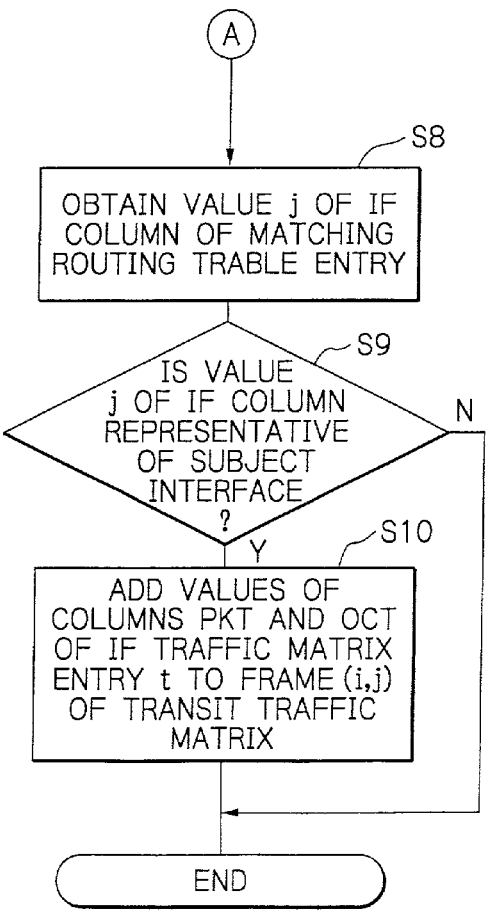

Reference will be made to FIGS. 6A and 6B for describing a specific transit traffic calculation procedure to be executed by the transit traffic measuring section 101. The NMS 206, FIG. 1, uses a network management protocol to send out a transit traffic collection request to the transit traffic measuring section 101 of the router. In the transit traffic measuring section 101, the network management agent 201 accepts the above request and delivers a transit traffic measurement request to the transit traffic matrix manager 202.

The transit traffic measurement request may sometimes be delivered from the measurement management scheduler 207 to the transit traffic matrix manager 202. More specifically, the scheduler 207 is capable of feeding the measurement request to the matrix manager 202 at scheduled intervals.

In the NMS 206, for example, desired subject interfaces are set whose transit traffic should be calculated in the transit traffic matrix manager 202 beforehand. In the specific procedure of FIGS. 6A and 6B, the interfaces if0, if1, if4 and if5 are set in the transit traffic matrix manager 202 by way of example.

Figures 7, 8:
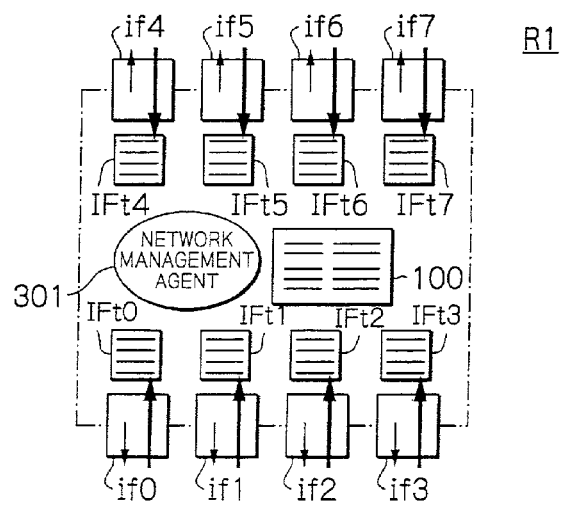
FIG. 7 shows a transit traffic matrix particular to the illustrative embodiment.
FIG. 8 is a schematic block diagram, similar to FIG. 1, showing a router in an alternative embodiment of the present invention.

The transit traffic matrix manager 202 obtains a list of subject interfaces i to be dealt with and then determines the total number r of interfaces (step S1). Subsequently, the matrix manager 202 generates an r×r transit traffic matrix configured to store the values PKT and OCT of the subject interfaces in its frames, and then initializes the matrix (step S2). In this specific procedure, the matrix manager 202 generates a 4×4 transit traffic matrix, as shown in FIG. 7.

After the step S2, the matrix manager 202 delivers a transit traffic calculation request to the transit traffic calculator 203. In response, the calculator 203 obtains the routing table 100, FIG. 1, from the routing table manager 205 (step S3). Part of the procedure following the step S3, i.e., steps S5 through S10 are repeated with all of the other subject interfaces whose transit traffic should be calculated (step S4).

In the step S5, the transit traffic calculator 203 obtains the IF traffic matrix of the first subject interface i whose transit traffic should be calculated. The procedure to follow, i.e., the steps S7 through S10 are repeated with all of the entries (step S6).

First, the transit traffic calculator 203 selects an entry heading the IF traffic matrix and uses the DST of the entry t thus located as a key to search the routing table by (step S7). By the search, the calculator 203 obtains a value j listed in the IF column of an entry that is included in the routing table and matches with the above entry (step S8). The calculator 203 then determines whether or not the above value j corresponds to any one of the subject interfaces (step S9) If the answer of the step S9 is negative (N),then the calculator 203 returns to the step S7 and again uses the DST of the next entry of the IF traffic matrix to search the routing table.

In step S9, if the value j of the IF column corresponds to any one of the subject interfaces (Yes), then the calculator 203 produces a single matrix listing SRC IFs (source interfaces) and a DST IF (destination interface) The SRC IFs refer to the values of the interfaces included in the current IF traffic matrix while the DST IF refers to the value of the IF column obtained from the routing table. The calculator 203 then adds the values of the columns PKT and OCT of the entry of the IF traffic matrix, which is currently dealt with, to the frames (i, j) of the frames of the transit traffic matrix that correspond to the above single matrix (step S10). Subsequently, the operation returns to the step S7 in order to repeat the above sequence of steps up to the last entry of the IF traffic matrix.

The procedure described with reference to FIGS. 6A and 6B is repeated with the IF traffic matrices of all of the subject interfaces to be dealt with, thereby completing a transit traffic matrix. Subsequently, the values in the rows of the transit traffic matrix are sequentially added to each other and the values in the columns of the transit traffic matrix are also sequentially added to each other to thereby produce the totals of the rows and columns. Further, all the rows of totals are summed up and all the columns of totals are summed up to determine the transit traffic of all of the subject interfaces.

As stated above, the illustrative embodiment is capable of grasping the measured values of transit traffic between any desired interfaces in each router independently of the other routers.

In an application in which the above router is connected to optical nodes having an optical path cut-through capability, the illustrative embodiment allows the optical nodes to transmit the measured values of the transit traffic between the above interfaces for thereby determining discrete optical path cut-through points.

Further, in the illustrative embodiment, the router generates the transit traffic matrix. This successfully reduces the amount of data to be transferred between the NMS and the individual router and thereby reduces loads on the network.

Reference will be made to FIG. 8 for describing a router representative of an alternative embodiment of the present invention. This embodiment is similar to the previous embodiment except that, as shown, the router R1 includes a network management agent 301 and excludes the other components of the transit traffic measuring section 101 shown in FIG. 5 than the network management agent 201. The network management agent 301 is similar to the network management agent 101 except that with the alternative embodiment the network management agent 301 is adapted to directly access the IF traffic matrices IFt0 through IFt7 of the interfaces if0 through if7, and the functions corresponding to the remaining functions of the measuring section 101 are assigned to the NMS 206. As for the configurations of the IF traffic matrices IFt0 through IFt7 and routing table 100, the illustrative embodiment is identical with the previous embodiment.

Figure 9:
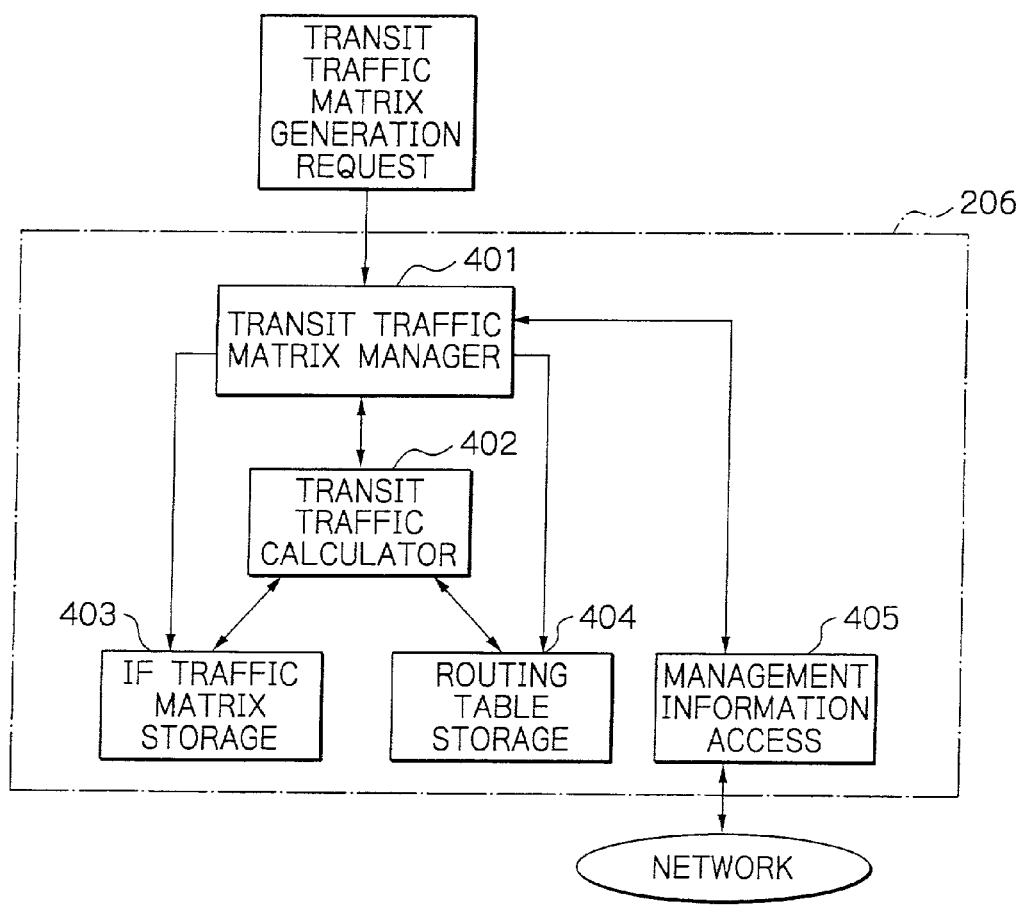
FIG. 9 is also a schematic block diagram showing an NMS included in the alternative embodiment.

FIG. 9 shows a specific configuration of the NMS 206 included in the alternative embodiment. As shown, the NMS 206 includes a transit traffic matrix manager 401, a transit traffic calculator 402, an IF traffic matrix storage 403, a routing table storage 404, and a management information access 405, which are substantially the same as corresponding ones of the embodiment shown and described with reference to FIG. 5. The functions assigned to the NMS 206 will become apparent from the following description of a specific, transit traffic calculation procedure.

If the transit traffic matrix manager 401 receives a transit traffic matrix generation request, then the transit traffic matrix manager 401 delivers to the management information access 405 a request for the collection of the IF traffic matrices IFt0 through IFt7 and routing table 100 of the subject interfaces of a router to be dealt with. Desired subject interfaces whose transit traffic should be calculated are set in the matrix manager 401 beforehand. In response to the above request, the management information access 405 sends out a collection request relating to the IF traffic matrices IFt0 through IFt7 and routing table 100 to a desired router under a network management protocol. In the router having received the collection request, the network management agent 301 sends the IF traffic matrices IFt0 through IFt7 and routing table 100 of the subject interfaces if0 through if7 to the NMS 206.

The IF traffic matrices IFt0 through IFt7 and routing table 100 are input to the transit traffic matrix manager 401 via the management information access 405. The matrix manager 401 stores the IF traffic matrices IFt0 through IFt7 and routing table 100 in the IF traffic matrix storage 403 and routing table storage 404, respectively.

Subsequently, the transit traffic matrix manager 401 delivers a transit traffic calculation request to the transit traffic calculator 402. In response, the calculator 402 obtains the IF traffic matrices IFt0 through IFt7 and routing table 100 from the storages 403 and 404, respectively. The calculator 402 then calculates transit traffic in the same manner as described with reference to FIGS. 6A and 6B, thereby generating the transit traffic matrix shown in FIG. 7. The transit traffic matrix is input to the transit traffic matrix manager 401.

The illustrative embodiment, like the previous embodiment, is capable of grasping the measured values of transit traffic between any desired interfaces in any desired router. Further, the illustrative embodiment reduces loads on the individual router because the NMS 206 concentratedly calculates a transit traffic matrix.

Figure 10:
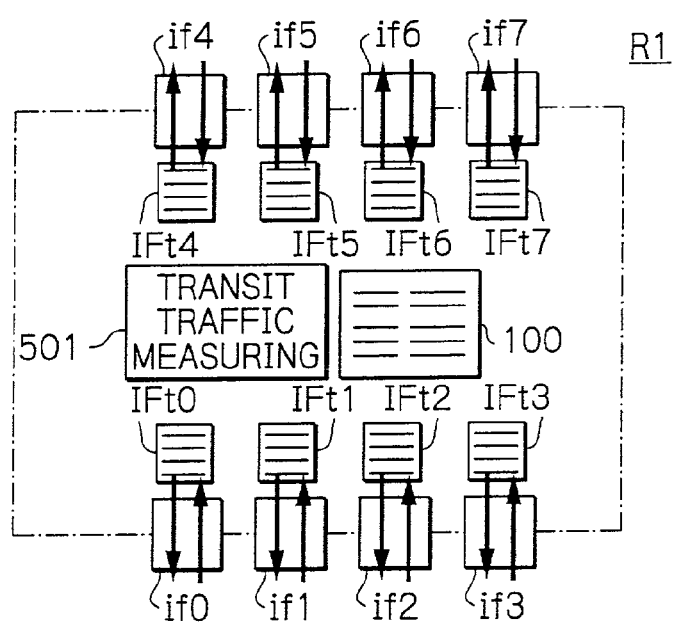
FIG. 10 is a schematic block diagram, similar to FIG. 1, showing another alternative embodiment of the present invention.

A router in accordance with another alternative embodiment of the present invention will be described with reference to FIG. 10. This embodiment is the same as the previous embodiments except that the IF traffic matrices IFt0 through IFt7 are adapted to store the statistics on both of L3 packets sent out and L3 packets received via the associated interfaces. As shown, the router R1 includes a transit traffic measuring section 501.

Figure 11:
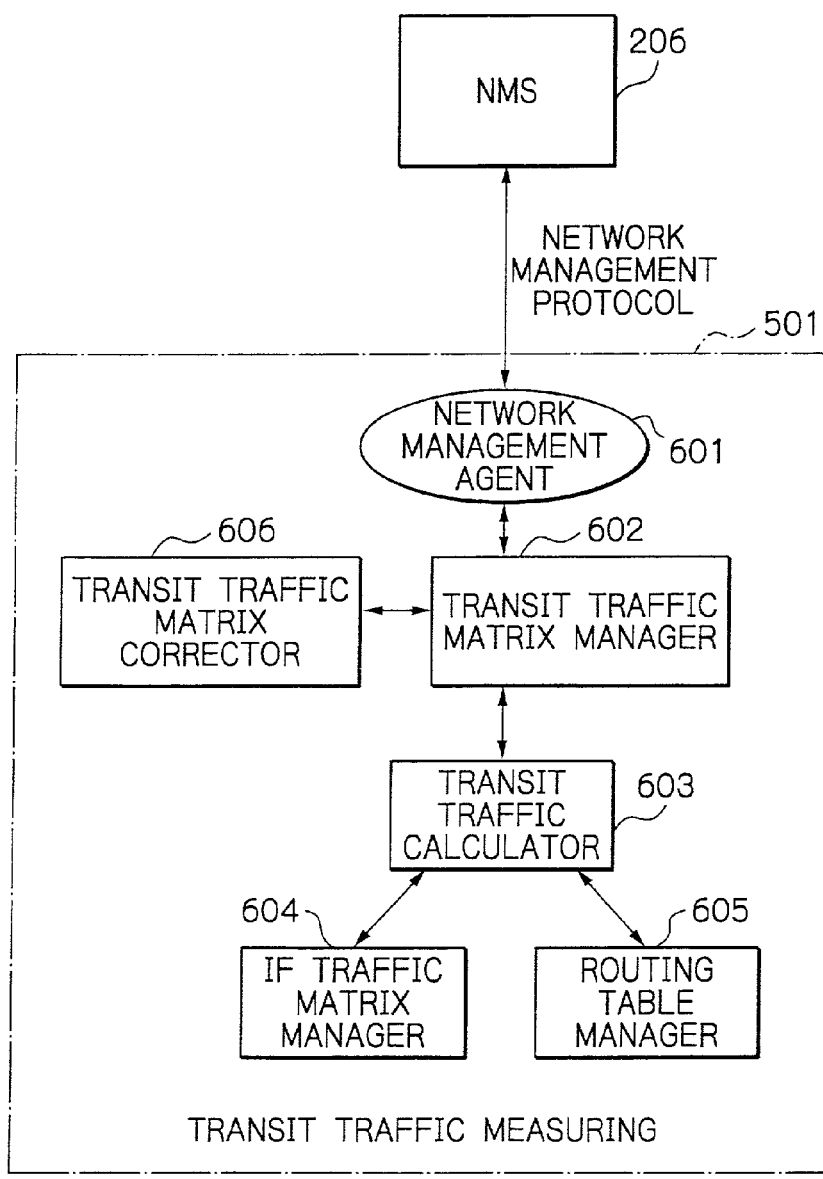
FIG. 11 is a schematic block diagram, similar to FIG. 5, showing a transit traffic measuring section included in the embodiment of FIG. 10.

FIG. 11 shows a specific configuration of the transit traffic measuring section 501. As shown, the transit traffic measuring section 501 includes a network management agent 601, a transit traffic matrix manager 602, a transit traffic calculator 603, an IF traffic matrix manager 604, a routing table manager 605, a transit traffic matrix corrector 606, which are substantially the same as corresponding ones of the embodiment shown and described with reference to FIG. 5. The functions assigned to those blocks of the measuring section 501 will become apparent from the following description of a specific, transit traffic calculation procedure.

When the transit traffic measuring section 501 calculates transit traffic between desired ones of the interfaces if0 through if7 on the basis of the IF traffic matrices each storing the statistics mentioned above, in the illustrative embodiment, the transit traffic measuring section 501 executes the procedure described with reference to FIGS. 6A and 6B to generate a transit traffic matrix listing all of the interfaces if0 through if7 of the router. FIG. 12 shows a transit traffic matrix calculated with all of the interfaces.

In the transit traffic matrix shown in FIG. 12, pkt00 through pkt77 and oct00 through oct77 indicated by bold frames do not represent accurate transit traffic between the associated interfaces. The transit traffic matrix corrector 606 then corrects the above inaccurate values by the following procedure. First, the corrector 606 corrects the values pkt00 through pkt77 by using the under-mentioned expressions:

$$(Pkt00-(Pkt10+Pkt20+Pkt30+Pkt40+Pkt50+Pkt60+Pkt70))/2\ Pkt00$$

$$(Pkt11-(Pkt01+Pkt21+Pkt31+Pkt41+Pkt51+Pkt61+Pkt71))/2\ Pkt11$$

$$(Pkt22-(Pkt02+Pkt12+Pkt32+Pkt42+Pkt52+Pkt62+Pkt72))/2\ Pkt22$$

$$(Pkt33-(Pkt03+Pkt13+Pkt23+Pkt43+Pkt53+Pkt63+Pkt73))/2\ Pkt33$$

$$(Pkt44-(Pkt04+Pkt14+Pkt24+Pkt34+Pkt54+Pkt64+Pkt74))/2\ Pkt44$$

$$(Pkt55-(Pkt05+Pkt15+Pkt25+Pkt35+Pkt45+Pkt65+Pkt75))/2\ Pkt55$$

(Pkt66−(Pkt06+Pkt16+Pkt26+Pkt36+Pkt46+Pkt56+
Pkt76))/2 Pkt66

(Pkt77−(Pkt07+Pkt17+Pkt27+Pkt37+Pkt47+Pkt57+
Pkt67))/2 Pkt77

Subsequently, the corrector 606 corrects the values oct00 through oct77 by using the following expressions:

(oct00−(oct10+oct20+oct30+oct40+oct50+oct60+
oct70))/2 oct00

(oct11−(oct01+oct21+oct31+oct41+oct51+oct61+
oct71))/2 oct11

(oct22−(oct02+oct12+oct32+oct42+oct52+oct62+
oct72))/2 oct22

(oct33−(oct03+oct13+oct23+oct43+oct53+oct63+
oct73))/2 oct33

(oct44−(oct04+oct14+oct24+oct34+oct54+oct64+
oct74))/2 oct44

(oct55−(oct05+oct15+oct25+oct35+oct45+oct65+
oct75))/2 oct55

(oct66−(oct06+oct16+oct26+oct36+oct46+oct54+
oct76))/2 oct66

(oct77−(oct07+oct17+oct27+oct37+oct47+oct57+
oct67))/2 oct77

Correction described above may not be executed with all of the interfaces if0 through if7, but with only desired interfaces selected, if desired.

Subsequently, the transit traffic calculator 603 generates a transit traffic matrix relating only to desired interfaces out of the corrected transit traffic matrix including all of the interfaces. If interfaces if0, if1, if4 and if5 are desired, then the following combinations of SRC IFs and DST IFs, i.e., (SRC IF, DST IF) of the desired interfaces are available:

(if0, if0), (if0, if1), (if0, if4), (if0, if5)
(if1, if0), (if1, if1), (if1, if4), (if1, if5)
(if4, if0), (if4, if1), (if4, if4), (if4, if5)
(if5, if0), (if5, if1), (if5, if4), (if5, if5)

Figures 13, 14:
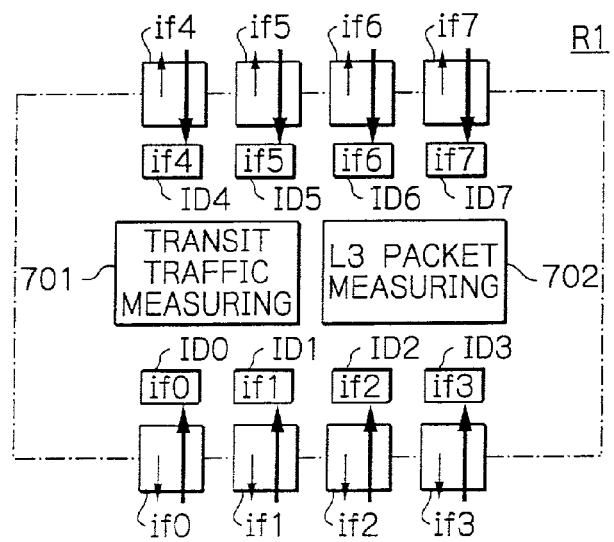
FIG. 13 shows a transit traffic matrix between desired interfaces.
FIG. 14 is a block diagram, similar to FIG. 1, schematically showing a further alternative embodiment of the present invention.

The transit traffic calculator 603 selects frames corresponding to the above combinations out of the transit traffic matrix of FIG. 12 and connects together for thereby producing a new matrix. FIG. 13 shows the resultant transit traffic matrix between the desired interfaces. Subsequently, the transit traffic calculator 603 totals the rows and columns of the new transit traffic matrix in the same manner as in the embodiment shown in FIGS. 2 through 6B.

As stated above, the illustrative embodiment is capable of generating an accurate transit traffic matrix even when the interface-by-interface IF traffic matrices store statistics on both of packets sent out and packets received.

A router representative of still another alternative embodiment of the present invention will be described with reference to FIG. 14. As shown, serial ID (identification) Nos. ID0 through ID7 each are attached to particular one of the interfaces if0 through if7. The router R1 includes a transit traffic measuring section 701 and an L3 packet transferring section 702. The L3 packet transferring section 702 is adapted to store a routing table and interface-Use columns. FIG. 15 shows a specific routing table and specific interface-Use columns if0-Use through if7-Use stored in the L3 packet transferring section 702. The interface-Use columns if0-Use through if7-Use are equal in number to the interfaces available in the router R1.

FIG. 16 shows a specific configuration of the transit traffic measuring section 701. As shown, the transit traffic measuring section 701 includes a network management agent 801, a transit traffic matrix manager 802, a transit traffic calculator 803, a preprocessing table storage 804, an interface-Use column manager 805, and a routing table manager 806. The functions assigned to the various sections of the measuring section 701 will become apparent from the following description of a specific procedure.

The L3 packet transferring section 702 transfers L3 packets received from the interfaces if0 through if7 while storing the interface ID numbers assigned to the interfaces together with the packets. More specifically, the transferring section 702 searches the routing table in order to select a matching entry. At this instant, the transferring section 702 counts up the column PKT of the interface-Use column matching with the interface ID number held by the packet. The transferring section 702 then adds the packet length of the packet to be processed to the column OCT. The transferring section 702 repeats the aforementioned sequence of steps every time it receives a packet.

Figure 17A:
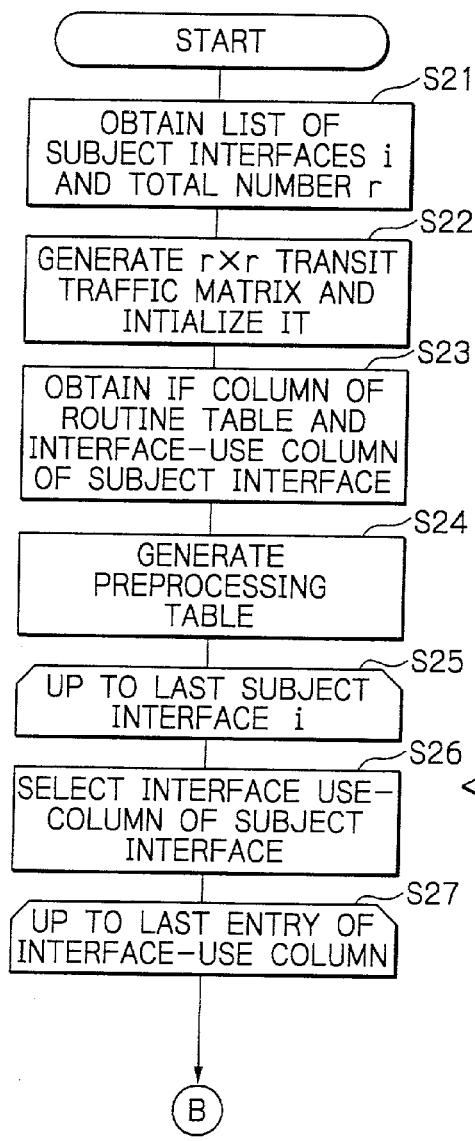
FIGS. 17A and 17B are flowcharts useful for understanding a specific transit traffic measuring procedure executed in the embodiment of FIG. 14.
Figure 17B:
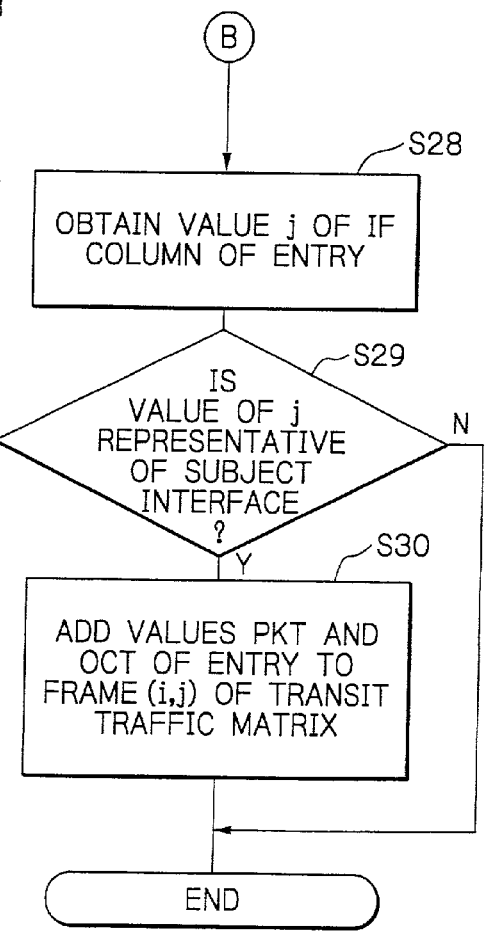

Reference will be made to FIGS. 17A and 17B for describing a specific operation of the transit traffic measuring section 701. Assume that the NMS sets the interfaces if0, if1, if4 and if5 in the transit traffic matrix manager 802 beforehand as desired subject interfaces whose transit traffic should be calculated.

The network management agent 801 then delivers a request for the collection of transit traffic to the transit traffic matrix manager 802. In response, the matrix manager 802 determines the total number r of the subject interfaces (step S21). The matrix manager 802 then produces a 4×4 or r×r matrix, which corresponds to the total number of subject interfaces, capable of storing values PKT and OCT and initializes the matrix (step S22). Subsequently, the matrix manager 802 delivers a transit traffic calculation request to the transit traffic calculator 803.

In response to the transit traffic calculation request, the calculator 803 obtains the IF columns and the interface-Use columns of the subject interfaces from the routing table via the routing table manager 806 and interface-Use column manager 805 (step S23). The calculator 803 then connects the IF columns and interface-Use columns to thereby prepare a preprocessing table shown in FIG. 18, which relates to the subject interfaces (step S24). The calculator 803 stores the preprocessing table in the preprocessing table storage 804.

Subsequently, the calculator 803 uses the preprocessing table to produce the transit traffic matrix of FIG. 7. Processing to follow, i.e., steps S26 through S30 are repeated up to the last subject interface i to be dealt with (step S25).

First, the calculator 803 selects the interface-Use column if0-Use of the first subject interface if1 (i) out of the preprocessing table (step S26). The steps S28 through S30 to follow are repeated up to the last interface-Use column (step S27). In the step S28, the calculator 803 obtains the value j of the IF column of the leading entry (step S28). In the specific preprocessing table shown in FIG. 18, the value of the above IF column is "if5". The calculator 803 then determines whether or not the value j of the interface designated by "if5" is a subject interface (step S29). If the answer of the step S29 is Yes, then the calculator 803 adds the values PKT and OCT of the leading entry into the corresponding frame shown in FIG. 7. At this instant, the calculator 803 uses the value of the IF column and the interface ID of the interface-Use column as DST IF and SRC IF, respectively; the combination (SRC IF, DST IF) of the leading entry is (if0, if5).

If the answer of the step S29 is No, meaning that the leading entry is not a subject interface, then the calculator 803 returns to the step S28, obtains the value of the IF column of the next entry, and again determines whether or not the above value is indicative of a subject interface. After repeating the above-mentioned sequence of steps up to the last entry, the calculator 803 selects the next interface-Use column (step S26) and again executes the procedure described above.

The calculator 803 repeats the procedure of FIGS. 17A and 17B up to the last interface-Use column of the preprocessing table to thereby complete a transit traffic matrix (step S27).

As stated above, the illustrative embodiment reduces a storage area to be allocated to stored statistics because the interface-Use columns are the only statistics relating to interface-by-interface received packets. The illustrative embodiment, of course, achieves the same advantages as the previous embodiments as well.

The illustrative embodiments have concentrated on a method of calculating transit traffic. They may, of course, be implemented as a transit traffic calculating device by hardware. Further, the traffic statistics are calculated on packets and octets used to estimate the traffic in the illustrative embodiments. Those specific statistics may of course be replaced with other feature values, taking account of the nature of applications of a type of telecommunications system.

In summary, it will be seen that the present invention provides a method of and an apparatus for calculating transit traffic having various unprecedented advantages, as enumerated below.

(1) The measured values of transit traffic between any desired interfaces in a specific router can be grasped independently of the other routers.

(2) A router generates a transit traffic matrix. This successfully reduces the amount of data to be transmitted between, e.g., routers and thereby reduces loads on a network.

(3) Loads on the individual routers are reduced because a transit traffic matrix is calculated outside of the routers.

(4) An accurate transit traffic matrix can be generated even when interface-by-interface IF traffic matrices store statistics on both of packets sent out and packets received.

(5) A storage area to be allocated to stored statistics is reduced because the interface-Use columns are the only statistics relating to interface-by-interface received packets.

The entire disclosure of Japanese patent application No. 2001-53893 filed on Feb. 28, 2001, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of calculating transit traffic in a router including a plurality of interfaces transmitting or receiving a packet in a form of octets, comprising the steps of:
   (a) preparing a routing table having an interface column defining one of the plurality of interfaces which is interconnected to a router to which a packet is to be transmitted;
   (b) generating a transit traffic matrix of a subject interface whose transit traffic is to be calculated and initializing the transit traffic matrix;
   (c) obtaining an interface traffic matrix of the subject interface, the interface traffic matrix having packet and octet columns in which numbers of packets and octets received are stored respectively;
   (d) searching the routing table with respect to the interface traffic matrix obtained to locate an entry of the routing table matching with the interface traffic matrix to obtain a value of the interface column of the located entry;
   (e) determining whether or not the obtained value of the interface column corresponds to the subject interface; and
   (f) adding, if the obtained value of the interface column is determined corresponding to the subject interface, values of the packet and octet columns of the subject interface in the interface traffic matrix to the transit traffic matrix.

2. The method in accordance with claim 1, further comprising the step (g) of collecting data to be stored in the routing table of the router and the interface traffic matrix of the subject interface.

3. The method in accordance with claim 1, further comprising the steps of:
   (g) after steps (a) through (f), correcting packet and octet values in a frame of the transit traffic matrix defined by one and the same interface of the plurality of interfaces as a source and a destination; and
   (h) generating a transit traffic matrix between desired ones of the plurality of interfaces from the transit traffic matrix corrected.

4. A method of calculating transit traffic in a router including a plurality of interfaces transmitting or receiving a packet in a form of octets, comprising the steps of:
   (a) preparing a routing table having an interface column defining one of the plurality of interfaces which is interconnected to a router to which a packet is to be transmitted;
   (b) holding interface-Use columns each associated with one of the plurality of interfaces;
   (c) holding, when transferring a packet, an interface identification assigned to one of the plurality of interfaces which has received a packet, together with the packet;
   (d) adding a packet value and an octet value to one of the interface-Use columns which corresponds to the interface identification held;
   (e) generating a preprocessing table for a subject interface whose transit traffic is to be calculated from the interface column of the routing table and one of the interface-Use columns which is associated with the subject interface, the preprocessing table having an interface column storing a value defining any of the plurality of interfaces;
   (f) searching the preprocessing table to determine which of the values in the interface column corresponds to the subject interface; and (g) adding, if one of the values in the interface column corresponds to the subject interface, values of the packet and octet columns corresponding to the subject interface in the preprocessing matrix to the transit traffic matrix.

5. A method of calculating transit traffic in a router including a plurality of interfaces transmitting or receiving a packet in a form of octets, comprising the steps of:
   (a) preparing a routing table having an interface column defining one of the plurality of interfaces which is interconnected to a router to which a packet is to be transmitted;
   (b) generating a transit traffic matrix having rows and columns corresponding to subject interfaces whose transit traffic is to be calculated;
   (c) initializing the transit traffic matrix;
   (d) obtaining interface traffic matrices of the subject interfaces, each of the interface traffic matrices having packet and octet columns in which numbers of packets and octets received are stored respectively;
   (e) searching the routing table with respect to the interface traffic matrices obtained to locate an entry of the routing table matching with each of the interface traffic matrices to obtain a value of the interface column of the located entry;
   (f) determining to which of the subject interfaces the obtained value of the interface column corresponds; and
   (g) adding, if one of the subject interfaces is determined which corresponds to the obtained value of the interface column, values of the packet and octet columns of the subject interface in the interface traffic matrix to the transit traffic matrix.

6. The method in accordance with claim 5, further comprising the steps of:
   (h) adding the values in the rows of the transit traffic matrix to each other, and adding the values in the columns of the transit traffic matrix to each other to produce totals of the rows and columns; and
   (i) summing up the total of the rows and the total of the columns to determine transit traffic of the subject interfaces.

7. An apparatus for calculating transit traffic in a router including a plurality of interfaces transmitting or receiving a packet in a form of octets, comprising:
   a circuit for generating a transit traffic matrix of a subject interface whose transit traffic is to be calculated and initializing the transit traffic matrix;
   a circuit for obtaining an interface traffic matrix of the subject interface having packet and octet columns in which numbers of packets and octets received are stored respectively, and searching with respect to the interface traffic matrix obtained a routing table having an interface column defining one of the plurality of interfaces which is interconnected to a router to which a packet is to be transmitted to locate an entry of the routing table matching with the interface traffic matrix to obtain a value of the interface column of the located entry;
   a circuit for determining whether or not the obtained value of the interface column corresponds to the subject interface; and
   a circuit for adding, if the obtained value of the interface column is determined corresponding to the subject interface, values of the packet and octet columns of the subject interface in the interface traffic matrix to the transit traffic matrix.

8. The apparatus in accordance with claim 7, wherein the router comprises a circuit for collecting data to be stored in the routing table of the router and the interface traffic matrix of the subject interface.

9. The apparatus in accordance with claim 7, further comprising:
   a circuit for correcting packet and octet values in a frame of the transit traffic matrix defined by one and the same interface of the plurality of interfaces as a source and a destination; and
   a circuit for generating a transit traffic matrix between desired ones of the plurality of interfaces from the transit traffic matrix corrected.

10. An apparatus for calculating transit traffic in a router including a plurality of interfaces transmitting or receiving a packet in a form of octets, comprising:
    a circuit for holding interface-Use columns each associated with one of the plurality of interfaces;
    a circuit for holding, when transferring a packet, an interface identification assigned to one of the plurality of interfaces which has received a packet, together with the packet;
    a circuit for adding a packet value and an octet value to one of the interface-Use columns which corresponds to the interface identification held;
    a routing table having an interface column defining one of the plurality of interfaces which is interconnected to a router to which a packet is to be transmitted;
    a circuit for generating a preprocessing table for a subject interface whose transit traffic is to be calculated from the interface column of the routing table and one of the interface-Use columns which is associated with the subject interface, the preprocessing table having an interface column storing a value defining any of the plurality of interfaces; and
    a circuit for searching the preprocessing table to determine which of the values in the interface column corresponds to the subject interface, and adding, if one of the values in the interface column corresponds to the subject interface, values of the packet and octet columns corresponding to the subject interface in the preprocessing matrix to the transit traffic matrix.

* * * * *